(12) United States Patent
Iwamura et al.

(10) Patent No.: US 11,110,750 B2
(45) Date of Patent: Sep. 7, 2021

(54) AIRLESS TIRE

(71) Applicant: Sumitomo Rubber Industries, Ltd., Hyogo (JP)

(72) Inventors: Wako Iwamura, Kobe (JP); Makoto Sugiya, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 507 days.

(21) Appl. No.: 16/108,318

(22) Filed: Aug. 22, 2018

(65) Prior Publication Data

US 2019/0061428 A1 Feb. 28, 2019

(30) Foreign Application Priority Data

Aug. 24, 2017 (JP) .............................. JP2017-160805

(51) Int. Cl.
  *B60C 7/18* (2006.01)
  *B60C 7/14* (2006.01)

(52) U.S. Cl.
  CPC ............... *B60C 7/18* (2013.01); *B60C 7/143* (2013.01); *B60C 2007/146* (2013.01)

(58) Field of Classification Search
  CPC .. B60C 7/18; B60C 7/14; B60C 7/143; B60C 2007/146; B60B 9/26
  See application file for complete search history.

(56) References Cited

U.S. PATENT DOCUMENTS

| 1,023,344 A | 4/1912 | Waldman |
| 1,348,522 A | 8/1920 | Sweiven |
| 2,705,539 A | 4/1955 | Martin |
| 3,018,809 A * | 1/1962 | Bernard ................ B60C 15/028 152/41 |
| 2009/0173421 A1* | 7/2009 | Love ........................ B60C 7/10 152/246 |
| 2011/0272254 A1* | 11/2011 | Anderfaas ................ B60C 7/10 198/780 |
| 2016/0200144 A1* | 7/2016 | Iwamura ............... B60B 1/0246 152/75 |
| 2017/0113490 A1 | 4/2017 | Iwamura et al. |

FOREIGN PATENT DOCUMENTS

| JP | 2014-080164 A | | 5/2014 | |
| JP | 2014118116 A | * | 6/2014 | .............. B60C 7/14 |
| JP | 2015-039986 A | | 3/2015 | |
| JP | 2015039986 A | * | 3/2015 | .............. B60C 7/14 |
| JP | 2015-101210 A | | 6/2015 | |
| JP | 2017-081199 A | | 5/2017 | |

OTHER PUBLICATIONS

Extended European Search Report issued by the European Patent Office dated Jan. 22, 2019, which corresponds to EP18187821.6-1012 and is related to U.S. Appl. No. 16/108,318.

* cited by examiner

*Primary Examiner* — Scott A Browne

(74) *Attorney, Agent, or Firm* — Studebaker & Brackett PC

(57) ABSTRACT

An airless tire comprises: a tread ring having a tread, a hub located radially inside the tread ring, and cross radial members connecting the tread ring with the hub. The cross radial members include first radial members and second radial members crossing the first radial members. The length measured along the radial member is not more than 180% of the radial distance between the hub and the tread ring.

15 Claims, 4 Drawing Sheets

AIRLESS TIRE

TECHNICAL FIELD

The present invention relates to an airless tire.

BACKGROUND ART

Japanese Patent Application Publication No. 2017-081199 (Patent document 1) discloses an airless tire composed of a tread ring having a tread, a hub attached to a vehicle's axle, and spokes connecting between the tread ring and the hub, wherein the spokes are each increased in the compressive stiffness in a radially outer part on the tread ring side as compared with a radially inner part on the hub side to improve the durability.

SUMMARY OF THE INVENTION

In the airless tire disclosed in Patent document 1, as the compressive stiffness of the spokes is relatively decreased in the radially inner parts, the ride comfort may be improved, but there is a possibility that the rolling resistance of the tire is increased. By increasing the compressive stiffness, the rolling resistance may be reduced, but the ride comfort is deteriorated. Thus, the airless tire has room for improvement in order to achieve both of the durability and the ride comfort, while reducing the rolling resistance.

It is therefore, an object of the present invention to provide an airless tire, in which, by employing cross radial members connecting between a tread ring and a hub instead of conventional spokes, the durability and the ride comfort can be achieved while reducing the rolling resistance.

According to the present invention, an airless tire comprises a tread ring having a tread, a hub located radially inside the tread ring, and cross radial members connecting the tread ring with the hub, wherein the cross radial members include
first radial members each extending from its first radially inner end to its first radially outer end, and
second radial members each extending from its second radially inner end to its second radially outer end, the first radially inner ends and the second radially outer ends are positioned on one side in the tire widthwise direction, whereas the second radially inner ends and the first radially outer ends are positioned on the other side in the tire widthwise direction, and a first length measured along the first radial member from the first radially inner end to the first outer end is not more than 180% of a distance measured in the tire radial direction between the hub and the tread ring.

It is preferable that the second length measured along the second radial member from the second radially inner end to the second radially outer end is equal to the first length.

It is preferable that the first length is not more than 110% of a first distance between the first radially inner end and the first radially outer end.

It is preferable that each of the cross radial members has a thickness in the tire axial direction and a width in the tire circumferential direction which is more than the thickness in the tire axial direction.

It is preferable that each of the cross radial members is curved in a tire meridian section including the radial member concerned.

It is preferable that each of the cross radial members has a width in the tire circumferential direction which is constant in the range from the hub to the tread ring.

It is preferable that each of the cross radial members has a width in the tire circumferential direction which is partially decreased to have a constricted part within the range from the hub to the tread ring.

It is preferable that the first radial members and the second radial members are alternately arranged in the tire circumferential direction.

Therefore, in the airless tire according to the present invention, as the cross radial members including the first radial members and the second radial members have lengths more than the radial distance between the hub and tread ring, it is possible reduce deformation of the first and second radial members cause by the deflection of the tread ring during running, therefore, the airless tire according to the present invention can be improved in the durability.

Further, as the first radial members cross the second radial members when viewed in the tire circumferential direction, the vertical spring constant of the airless tire can be reduced while maintaining adequate rigidity of the radial members. Furthermore, the cross radial members can support the tread ring uniformly, and uncomfortable vibrations can be prevented. Thus, the airless tire according to the present invention can improve the ride comfort.

In addition, as the first length of the first radial members is not more than 180% of the radial distance between the hub and tread ring, the rigidity in the tire radial direction of the first radial members is high, and thereby the deflection of the tread ring of the during running can be prevented. Thus, the rolling resistance of the airless tire according to the present invention can be reduced.

DESCRIPTION OF THE PREFERRED EMBODIMENTS

Embodiments of the present invention will now be described in detail in conjunction with accompanying drawings.

Figure 1:
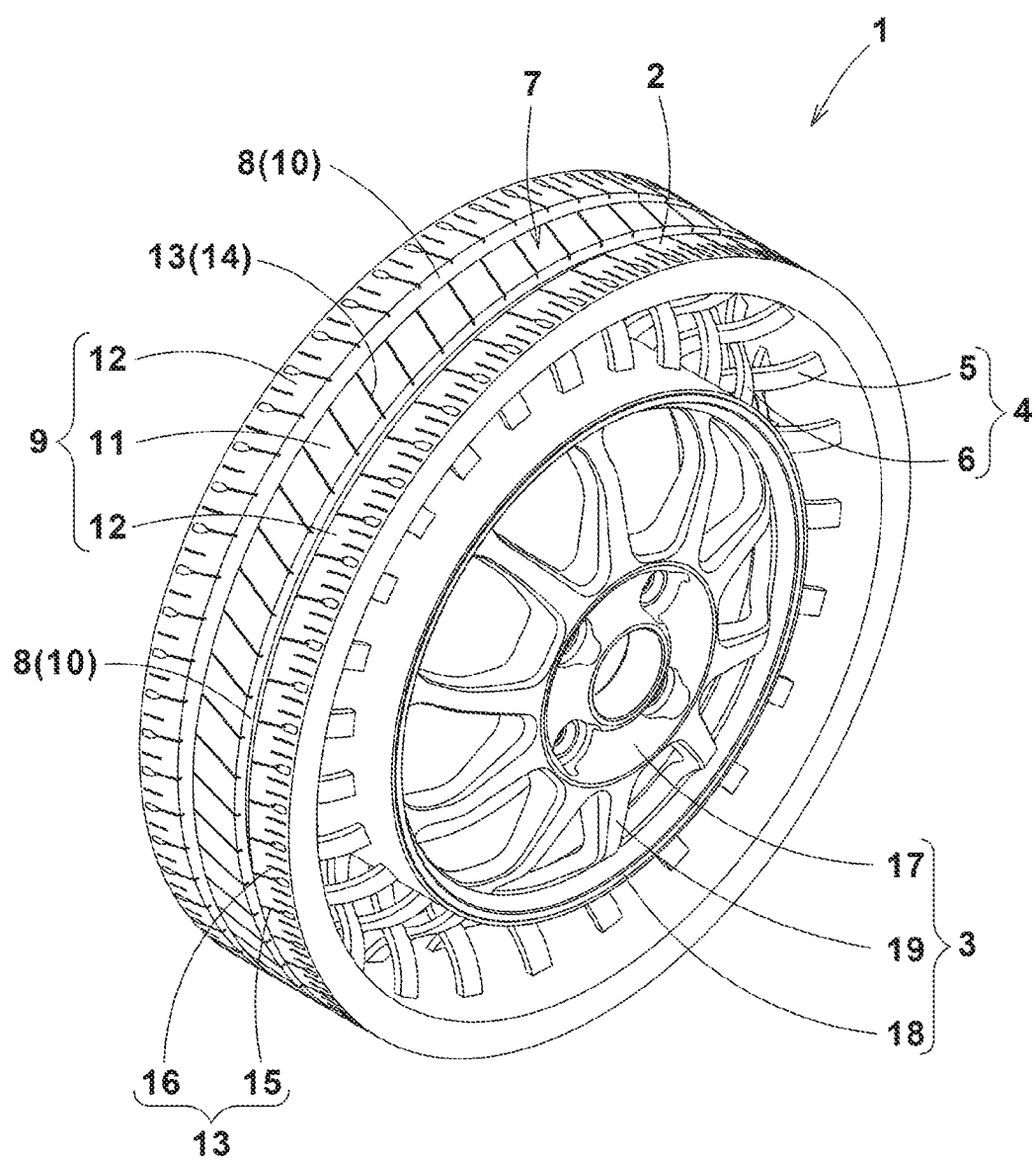
FIG. 1 is a perspective view of an airless tire as an embodiment of the present invention.
Figure 2:
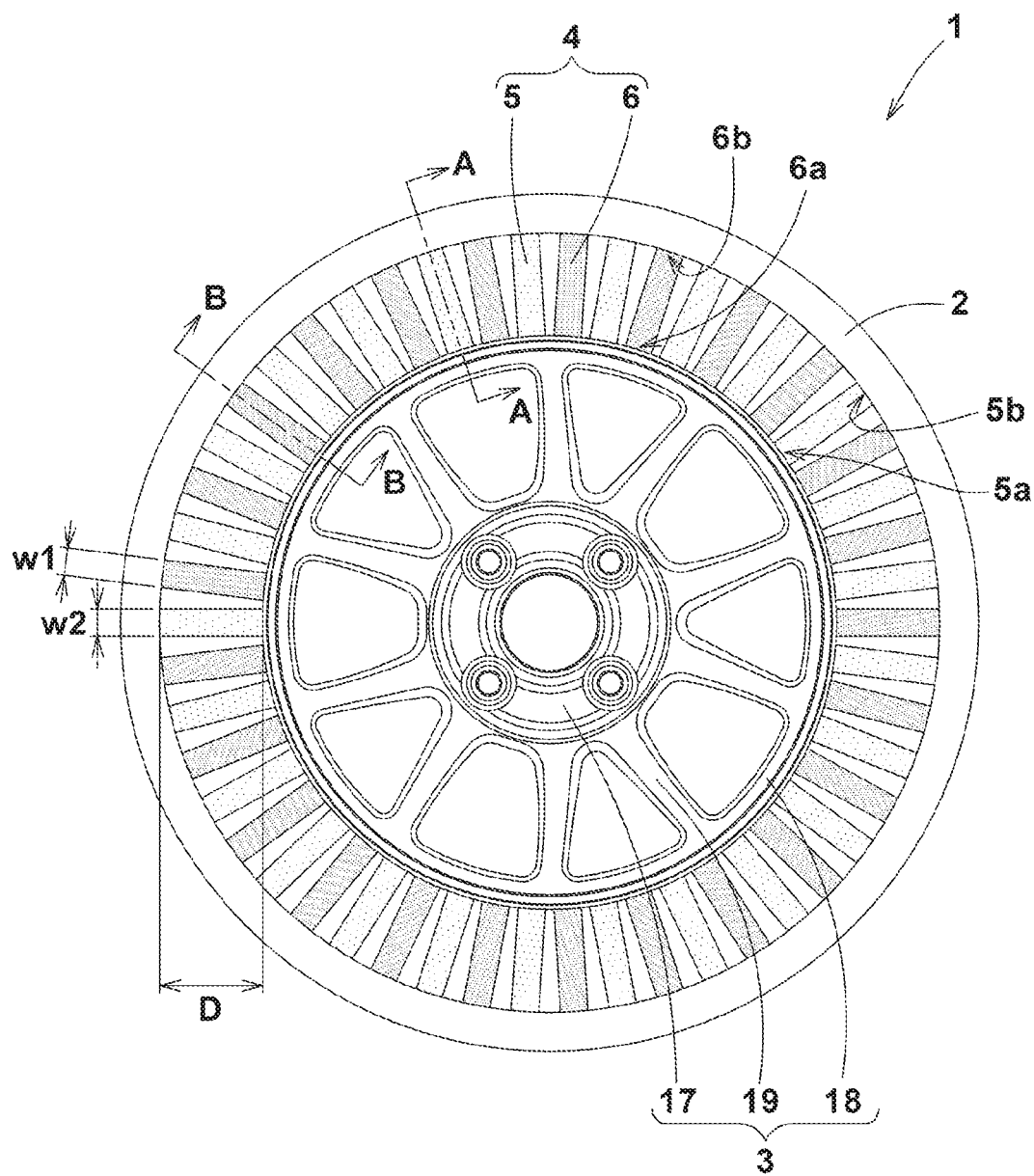
FIG. 2 is a side view of the airless tire in FIG. 1.

FIG. 1 and FIG. 2 show an airless tire 1 as an embodiment of the present invention. The airless tire 1 comprises a tread ring 2 having a tread contacting with the ground during running, the hub 3 disposed radially inside the tread ring 2, and load-supporting elastic cross radial members 4 connecting the tread ring 2 with the hub 3.

The airless tire 1 supports the tire load by the cross radial members 4 extending between the hub 3 and the tread ring 2 unlike a pneumatic tire which supports the tire load by its internal air pressure. Accordingly, the airless tire 1 does not suffer from puncture.

Figure 3:
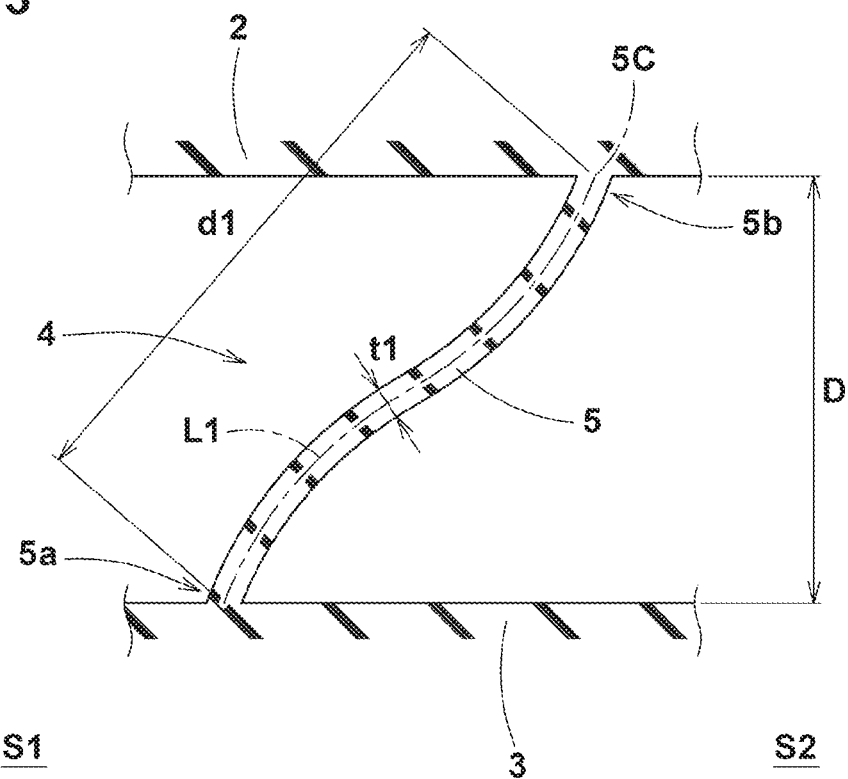
FIG. 3 is a cross sectional view of the first radial member taken along line A-A of FIG. 2.
Figure 4:
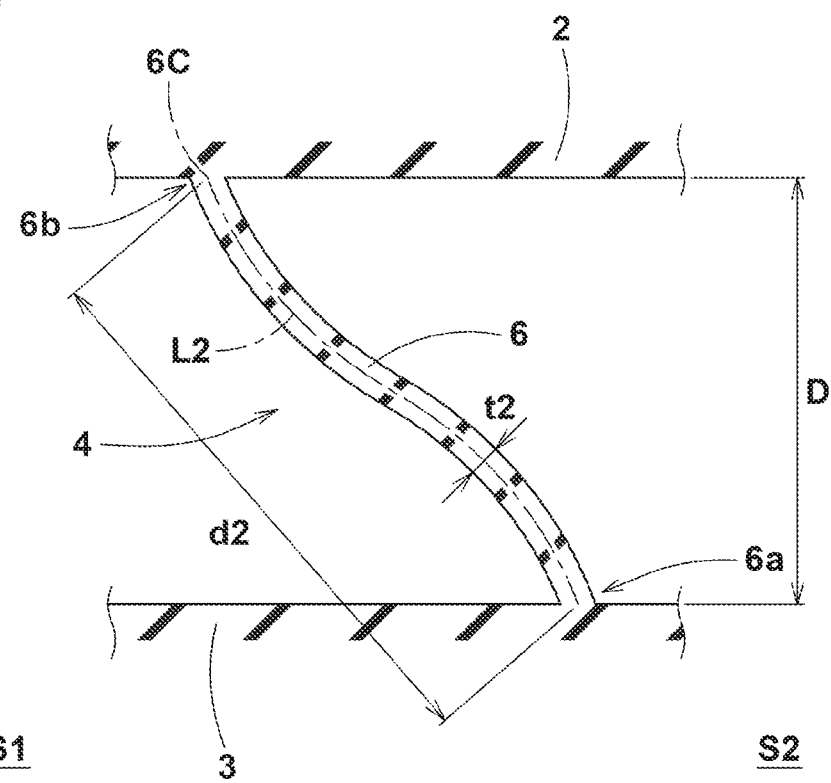
FIG. 4 is a cross sectional view of the second radial member taken along line B-B of FIG. 2.

As shown in FIG. 2 to FIG. 4, the cross radial members 4 include the first radial members 5 and the second radial members 6.

The first radial member 5 extends from its first radially inner end 5a to its first radially outer end 5b.

The second radial member 6 extends from its second radially inner end 6a to its second radially outer end 6b.

In FIG. 2, for the sake of easy identification, the first radial members 5 and the second radial members 6 are filled with a thin dot pattern and a dense dot pattern, respectively.

As shown in FIG. 3 and FIG. 4, the radially inner ends 5a and the second radially outer ends 6b are positioned on one side S1 in the tire widthwise direction, whereas the second radially inner ends 6a and the first radially outer ends 5b are positioned on the other side S2 in the tire widthwise direction.

Therefore, the first radial members 5 cross the second radial members 6 when viewed in the tire circumferential direction as shown in FIG. 1. As a result, the airless tire 1 can be reduced in the vertical spring constant, while allowing the tread ring 2 to have adequate rigidity. Further, the cross radial members 4 can support the tread ring 2 uniformly so as not to cause uncomfortable vibrations. Therefore, the airless tire 1 can improve the ride comfort.

Furthermore, the lengths of the cross radial members 4 become more than the distance D in the tire radial direction between the hub 3 and the tread ring 2. As a result, it is possible to relatively reduce deformation of the cross radial members 4 caused by deflection of the tread ring 2 during running, therefore, the durability of the airless tire 1 can be improved.

Preferably, the first length L1 measured along the first radial member 5 from the first radially inner end 5a to the first radially outer end 5b is set to be not more than 180% of the distance D in the tire radial direction between the hub 3 and the tread ring 2.

To be precise, as shown in FIG. 3, the first length L1 of the first radial member 5 is measured along the center line 5c in the thickness t1 in the tire axial direction of the first radial member 5 from the first radially inner end 5a to the first radially outer end 5b.

Preferably, the second length L2 measured along the second radial member 6 from the second radially inner end 6a to the second radially outer end 6b is set to be not more than 180% of the distance D in the tire radial direction between the hub 3 and the tread ring 2.

To be precise, as shown in FIG. 4, the second length L2 of the second radial member 6 is measured along the center line 6C in the thickness t2 in the tire axial direction of the second radial member 6 from the second radially inner end 6a to the second radially outer end 6b.

Such radial members 5 and 6 have rigidity in the tire radial direction which is sufficient to prevent excessive deflection of the tread ring 2 during running, as a result, the rolling resistance of the airless tire 1 can be reduced.

As explained above, by crossing the first radial members 5 and the second radial members 6 and specifically defining their lengths, the airless tire 1 can achieve durability and ride comfort, while reducing the rolling resistance.

Further preferable features for the airless tire 1 in the present embodiment are described below.

The tread ring 2 has a tread face 7 contacting with the ground, and the tread face 7 in the present embodiment is, as shown in FIG. 1, provided with tread grooves 8 and land regions 9 divided by the tread grooves 8.

The tread grooves 8 in this example include two circumferential main grooves 10. Thus, the land regions 9 include a crown land region 11 between the two circumferential main grooves 10, and a pair of shoulder land regions 12 axially outside the circumferential main grooves 10.

The land regions 9 in this example are provided with a number of sipes 13 extending in the tire axial direction. The sipes 13 include crown sipes 14 disposed in the crown land region 11, and first shoulder sipes 15 and second shoulder sipes 16 disposed in the shoulder land regions 12.

The crown sipes 14 in this example are each connected to the two circumferential main grooves 10. The first shoulder sipes 15 in this example are connected to the circumferential main grooves 10, but the second shoulder sipes 16 in this example are terminated within the shoulder land regions 12 without connected to the circumferential main grooves 10. Such sipes 13 can optimize the rigidity of the tread face 7 and improve the ride comfort.

In the present embodiment, as shown in FIG. 1 and FIG. 2, the hub 3 comprises a fixed portion fixed to a vehicle's axle 17, a cylindrical portion 18 to which radially inner ends 5a and 6a of the cross radial members 4 are connected, and a connecting portion 19 connecting between the fixed portion 17 and the cylindrical portion 18. The connecting portion 19 in the present embodiment is composed of spokes extending between the fixed portion 17 and the cylindrical portion 18. The number of the spokes is less than the number of the cross radial members 4. Thus, the hub 3 can achieve weight reduction and rigidity. However, the connecting portion 19 can be formed in the form of a disk instead of the spokes.

In the present embodiment, the first radial members 5 and the second radial members 6 of the cross radial members 4 are arranged alternately in the tire circumferential direction in order to support the tread ring 2 uniformly in the tire circumferential direction and thereby to suppress uncomfortable vibrations and improve the ride comfort.

In the present embodiment, as shown in FIG. 2 to FIG. 4, the cross radial members 4 are each formed in the form of a plate. Each radial member 4 has a thickness t1, t2 in the tire axial direction and a width w1, w2 in the tire circumferential direction, and preferably, the width w1, w2 in the tire circumferential direction is more than the thickness t1, t2. Specifically, it is preferable that the first radial member 5 is formed in the form of a plate where the width w1 in the tire circumferential direction is more than the thickness t1 in the tire axial direction, and the second radial member 6 is formed in the form of a plate where the width w2 in the tire circumferential direction is more than the thickness t2 in the tire axial direction.

Such cross radial members 4 can reduce variations in the tire circumferential direction of the deflection of the tread ring 2 during running, and can reduce the rolling resistance of the airless tire 1.

In the present embodiment, as shown in FIG. 2, the widths w1 and w2 in the tire circumferential direction of the cross radial members 4 are constant in the range in the tire radial direction from the hub 3 to the tread ring 2.

The width w1 in the tire circumferential direction of the first radial members 5 is preferably equal to the width w2 in the tire circumferential direction of the second radial members 6. Such cross radial members 4 can reduce the variations in the tire circumferential direction of the deflection of the tread ring 2 during running, and further reduce the rolling resistance of the airless tire 1.

As shown in FIG. 3, the first length L1 of the first radial member 5 is preferably set to be not less than 110%, more preferably not less than 120% of the distance D in the tire radial direction between the hub 3 and the tread ring 2 in order to reduce deformation of the first radial member 5 caused by the deflection of the tread ring 2 during running and thereby improve the durability of the airless tire 1.

As shown in FIG. 4, the second length L2 of the second radial member 6 is preferably set to be not less than 110%, more preferably not less than 120% of the distance D in the tire radial direction between the hub 3 and the tread ring 2 in order to reduce deformation of the second radial member 6 caused by the deflection of the tread ring 2 during running and thereby improve the durability of the airless tire 1.

It is desirable that the first length L1 of the first radial members 5 is set to be equal to the second length L2 of the second radial members 6 in order to uniformly restrict the deflection of the tread ring 2 during running, and thereby to reduce the rolling resistance of the airless tire 1.

In the present embodiment, each of the cross radial members 4 (5, 6) is curved in a tire meridian section including the radial member concerned as shown in FIGS. 3 and 4.

It is desirable that the first radial members 5 and the second radial members 6 are curved in the respective tire meridian sections symmetrically about a plane parallel with the tire equatorial plane in order to uniformly support the tread ring 2. Therefore, the airless tire 1 can be improved in the ride comfort.

In the present embodiment, the first length L1 of the first radial member 5 is more than the first linear distance d1 between the first radially inner end 5a and first radially outer end 5b, and
the second length L2 of the second radial member 6 is more than the second linear distance d2 between the second radially inner end 6a and second radially outer end 6b.
The first length L1 is preferably not more than 110% of the first linear distance d1.
The second length L2 is preferably not more than 110% of the second linear distance d2.
Such cross radial members 4 allow the tread ring 2 to have adequate rigidity, therefore, the airless tire 1 is further reduced in the rolling resistance.

Figure 5:
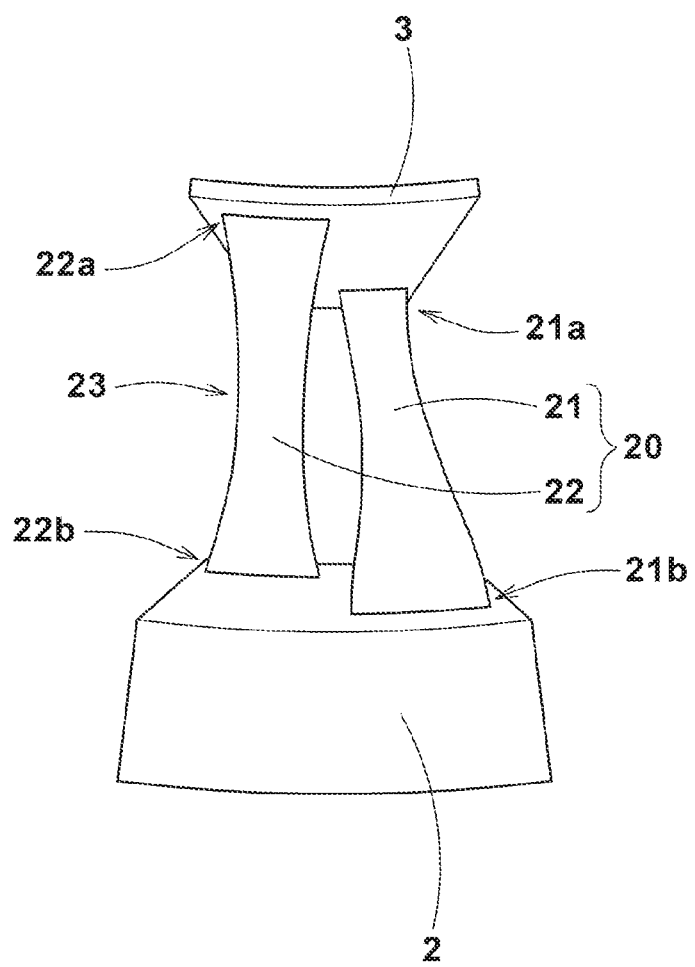
FIG. 5 is a perspective view showing one of first radial members and one of second radial members of another example of the cross radial members.

FIG. 5 shows cross radial members 20 as a modified example of the above-mentioned cross radial members 4.

Similarly to the former example, the cross radial members 20 include: first radial members 21 each extending from the first radially inner end 21a to the first radially outer end 21b, and second radial members 22 each extending from the second radially inner end 22a to the second radially outer end 22b, wherein the first inner ends 21a and the second outer ends 22b are positioned on one side S1 in the tire widthwise direction, and the second inner ends 22a and the first radially outer ends 21b are positioned on the other side S2 in the tire widthwise direction. Therefore, the first radial members 21 cross the second radial members 22 when viewed in the tire circumferential direction.

Unlike the former example in which the widths w1 and w2 in the tire circumferential direction are constant as shown in FIG. 2, in this example, each of the cross radial members 20 is partially decreased in the width in the tire circumferential direction so that a constricted part 23 is formed in the range in the tire radial direction from the hub 3 to the tread ring 2 in order that the cross radial members 20 achieve a weight reduction and rigidity at the same time. Thereby, the ride comfort and the rolling resistance can be improved in a good balance.

While detailed description has been made of preferable embodiments of the present invention, the present invention can be embodied in various forms without being limited to the illustrated embodiments.

Comparison Tests

Based on the structure shown in FIG. 1, airless tires were experimentally manufactured and tested for the durability, ride comfort and rolling resistance.

The airless tires had a size corresponding to a pneumatic tire size 115/85R13 and specifications shown in Table 1.

<Durability Test> using a tire test drum, each tire was run under a tire load of 1.5 kN at a speed of 60 km/h, and the running distance until failure occurred was measured. The results are indicated in Table 1 by an index based on comparative example Ref. 1 being 100, wherein the larger the index, the better the durability.

<Ride Comfort Test>

Each tire was measured for the vertical spring constant under a tire load of 1.5 kN as a typical judgmental standard for the ride comfort. The results are indicated in Table 1 by an index based on comparative example Ref. 1 being 100, wherein the smaller the index, the better the ride comfort.

<Rolling Resistance Test>

Using a tire rolling resistance tester, each tire was measured for the rolling resistance at a speed of 40 km/h under a tire load of 1.17 kN, and the rolling resistance coefficient (=rolling resistance/tire load×10^4) was obtained. The results are indicated in Table 1 by an index based on comparative example Ref. 1 being 100, wherein the smaller the index, the better the rolling resistance.

TABLE 1

| Tire | Ref. 1 | Ref. 2 | Ref. 3 | Ex. 1 | Ex. 2 | Ex. 3 |
|---|---|---|---|---|---|---|
| radial members number of kind(s) | 1 | 2 | 2 | 2 | 2 | 2 |
| arrangement | not cross | not cross | cross | cross | cross | cross |
| width in circumferential direction | not constant | constant | constant | constant | constant | constant |
| constricted part | present | absent | absent | absent | absent | absent |
| first length L1/ distance D (%) | 100 | 103 | 185 | 125 | 106 | 110 |
| first length L1/ first distance d1 (%) | 102 | 102 | 102 | 102 | 102 | 102 |
| durability | 100 | 130 | 350 | 300 | 150 | 200 |
| ride comfort | 100 | 100 | 25 | 50 | 90 | 70 |
| rolling resistance | 100 | 100 | 175 | 110 | 103 | 105 |

| Tire | Ex. 4 | Ex. 5 | Ex. 6 | Ex. 7 | Ex. 8 |
|---|---|---|---|---|---|
| radial members number of kind(s) | 2 | 2 | 2 | 2 | 2 |
| arrangement | cross | cross | cross | cross | cross |
| width in circumferential direction | constant | constant | constant | constant | not constant |

TABLE 1-continued

| constricted part | absent | absent | absent | absent | present |
|---|---|---|---|---|---|
| first length L1/ distance D (%) | 180 | 125 | 125 | 125 | 125 |
| first length L1/ first distance d1 (%) | 102 | 100 | 110 | 115 | 102 |
| durability | 300 | 200 | 200 | 160 | 300 |
| ride comfort | 30 | 50 | 45 | 40 | 50 |
| rolling resistance | 130 | 110 | 120 | 125 | 105 |

From the test results, it was confirmed that the airless tires according to the present invention can be improved in the durability, ride comfort and rolling resistance in a good balance as compared with comparative examples.

REFERENCE SIGNS LIST 1 airless tire
2 tread ring
3 hub
4 spokes
5 first radial member
5a first radially inner end
5b first radially outer end
6 second radial member
6a second radially inner end
6b second radially outer end

The invention claimed is:

1. An airless tire comprising:
a tread ring having a tread,
a hub located radially inside the tread ring, and
cross radial members connecting the tread ring with the hub, wherein
the cross radial members include first radial members each extending from its first radially inner end at the hub to its first radially outer end at the tread ring, and second radial members each extending from its second radially inner end at the hub to its second radially outer end at the tread ring,
the first radially inner ends and the second radially outer ends are positioned on one side in the tire widthwise direction, whereas the second radially inner ends and the first radially outer ends are positioned on the other side in the tire widthwise direction,
the first radially inner ends and the second radially outer ends are positioned only on the one side and not on the other side, and the second radially inner ends and the first radially outer ends are positioned only on the other side and not on the one side, such that adjacent first and second radial members are arranged in a substantially X-shape when viewed from the tire circumferential direction,
each of the cross radial members is curved in a tire meridian section,
a first length measured along the first radial member from the first radially inner end to the first outer end is not less than 110% and not more than 180% of a distance measured in the tire radial direction between the hub and the tread ring, and
the first length is not more than 110% of a first distance between the first radially inner end and the first radially outer end.

2. The airless tire according to claim 1, wherein
a second length measured along the second radial member from the second radially inner end to the second radially outer end is equal to the first length.

3. The airless tire according to claim 1, wherein
each of the cross radial members has a thickness in the tire axial direction and a width in the tire circumferential direction which is more than the thickness in the tire axial direction.

4. The airless tire according to claim 2, wherein
each of the cross radial members has a thickness in the tire axial direction and a width in the tire circumferential direction which is more than the thickness in the tire axial direction.

5. The airless tire according to claim 1, wherein
each of the cross radial members has a width in the tire circumferential direction which is constant in the range from the hub to the tread ring.

6. The airless tire according to claim 2, wherein
each of the cross radial members has a width in the tire circumferential direction which is constant in the range from the hub to the tread ring.

7. The airless tire according to claim 3, wherein
each of the cross radial members has a width in the tire circumferential direction which is constant in the range from the hub to the tread ring.

8. The airless tire according to claim 1, wherein
each of the cross radial members has a width in the tire circumferential direction which is partially decreased to have a constricted part within the range from the hub to the tread ring.

9. The airless tire according to claim 2, wherein
each of the cross radial members has a width in the tire circumferential direction which is partially decreased to have a constricted part within the range from the hub to the tread ring.

10. The airless tire according to claim 3, wherein
each of the cross radial members has a width in the tire circumferential direction which is partially decreased to have a constricted part within the range from the hub to the tread ring.

11. An airless tire comprising:
a tread ring having a tread,
a hub located radially inside the tread ring, and
cross radial members connecting the tread ring with the hub,
wherein each of the cross radial members has a thickness in a tire axial direction and a width in the tire circumferential direction which is more than the thickness,
wherein the cross radial members include first radial members each extending from its first radially inner end at the hub to its first radially outer end at the tread ring, and second radial members each extending from its second radially inner end at the hub to its second radially outer end at the tread ring,
wherein the cross radial members are arranged alternately in the tire circumferential direction, such that circumferentially adjacent first and second radial members are arranged in a substantially X-shape when viewed from the tire circumferential direction, the first radially inner ends are positioned only in one side in a tire widthwise direction of the hub, the second radially inner ends are positioned only in the other side in the tire widthwise direction of the hub, the second radially outer ends are positioned only in one side in the tire widthwise direction of the tread ring, and the first radially outer ends are positioned only in the other side in the tire widthwise direction of the tread ring, and wherein in a meridian section of the tire including each of the cross radial members, the cross radial member is curved, such that each first radial member has a first length measured along the first radial member from the first radially inner end to the first radially outer end, each second radial member has a second length measured along the second radial member from the second radially inner end to the second radially outer end, the first length is equal to the second length, the first length is not more than 110% of a first distance measured between the first radially inner end and the first radially outer end, and the first length is not less than 110% and not more than 180% of a distance measured in the tire radial direction between the hub and the tread ring.

12. The airless tire according to claim 11, wherein the width in the tire circumferential direction of each of the cross radial members is partially decreased in a middle portion of the cross radial member between the hub and the tread ring.

13. An airless tire comprising:
a tread ring having a tread,
a hub located radially inside the tread ring, and
cross radial members connecting the tread ring with the hub,
wherein each of the cross radial members has a thickness and a width in the tire circumferential direction which is more than the thickness,
wherein the cross radial members include first radial members each extending from its first radially inner end connected to the hub to its first radially outer end connected to the tread ring, and second radial members each extending from its second radially inner end connected to the hub to its second radially outer end connected to the tread ring, and the first radial members and the second radial members are arranged alternately in the tire circumferential direction such that circumferentially adjacent first and second radial members are arranged in a substantially X-shape when viewed from the tire circumferential direction, wherein in a meridian section of the tire including each of the cross radial members, a thickness center of said each of the cross radial members is curved, such that each first radial member has a first length measured along the thickness center of the first radial member from the first radially inner end to the first radially outer end, each second radial member has a second length measured along the thickness center of the second radial member from the second radially inner end to the second radially outer end, the first length is equal to the second length, and the first length is not more than 110% of a first distance between the first radially inner end and the first radially outer end, and the first length is not less than 110% and not more than 180% of a distance measured in the tire radial direction between the hub and the tread ring, wherein the hub comprises:
a fixed portion fixed to a vehicle's axle;
a cylindrical portion to which the radially inner ends of the first and second cross radial members are connected; and
a plurality of spokes extending between the fixed portion and the cylindrical portion to connect therebetween, and
the number of the spokes is less than the number of the first and second cross radial members.

14. The airless tire according to claim 13, wherein the width in the tire circumferential direction of each of the cross radial members is partially decreased in a middle portion of the cross radial member between the hub and the tread ring.

15. The airless tire according to claim 13, wherein each of the cross radial members has a substantially constant thickness.

* * * * *